US012003939B2

(12) United States Patent
Zhang et al.

(10) Patent No.: US 12,003,939 B2
(45) Date of Patent: Jun. 4, 2024

(54) VOICE COIL WIRE FOR SOUND GENERATING DEVICE, VOICE COIL AND SOUND GENERATING DEVICE

(71) Applicant: GOERTEK INC., Shandong (CN)

(72) Inventors: Zhibing Zhang, Shandong (CN); Jie Yang, Shandong (CN)

(73) Assignee: GOERTEK INC., Weifang (CN)

( * ) Notice: Subject to any disclaimer, the term of this patent is extended or adjusted under 35 U.S.C. 154(b) by 184 days.

(21) Appl. No.: 17/782,738

(22) PCT Filed: Nov. 6, 2020

(86) PCT No.: PCT/CN2020/126909
§ 371 (c)(1),
(2) Date: Jun. 6, 2022

(87) PCT Pub. No.: WO2021/109790
PCT Pub. Date: Jun. 10, 2021

(65) Prior Publication Data

US 2023/0007403 A1 Jan. 5, 2023

(30) Foreign Application Priority Data

Dec. 6, 2019 (CN) ......................... 201911244737.7

(51) Int. Cl.
*H04R 9/04* (2006.01)
*H04R 7/04* (2006.01)
(Continued)

(52) U.S. Cl.
CPC ............... *H04R 9/046* (2013.01); *H04R 7/04* (2013.01); *H04R 9/025* (2013.01); *H04R 9/06* (2013.01)

(58) Field of Classification Search
CPC .......... H04R 9/046; H04R 7/04; H04R 9/025; H04R 9/06
(Continued)

(56) References Cited

U.S. PATENT DOCUMENTS 1,849,495 A * 3/1932 Lyle ......................... H04R 9/06 330/203
2,548,235 A * 4/1951 Olson ....................... H03F 3/28 381/117
(Continued)

FOREIGN PATENT DOCUMENTS

CN 101499328 A 8/2009
CN 101944399 A 1/2011
(Continued)

OTHER PUBLICATIONS

International Search Report from International Application No. PCT/CN2020/126909 dated Jan. 27, 2021.
(Continued)

*Primary Examiner* — Sean H Nguyen
(74) *Attorney, Agent, or Firm* — Shih IP Law Group, PLLC

(57) ABSTRACT

Provided is a voice coil wire for a sound generating device, comprising a wire body and a cavity provided in the wire body, the wire body is configured to be applied with a current signal, wherein the cavity is in a vacuum state or is filled with an insulating gas. Also provided is a voice coil, the voice coil is provided with the voice coil wire. Also provided is a sound generating device. By filling the cavity of the voice coil wire with the insulating gas or configuring the cavity to be in the vacuum state, the weight of the voice coil wire can be reduced, so the influence of skin effect on the voice coil wire is reduced, and the utilization rate of the voice coil wire is improved.

11 Claims, 4 Drawing Sheets

(51) Int. Cl.
*H04R 9/02* (2006.01)
*H04R 9/06* (2006.01)

(58) Field of Classification Search
USPC .......................................................... 381/400
See application file for complete search history.

(56) References Cited

U.S. PATENT DOCUMENTS

| | | | | |
|---|---|---|---|---|
| 2007/0160246 | A1* | 7/2007 | Vollmer | H04R 1/42 381/336 |
| 2017/0223463 | A1* | 8/2017 | Salvatti | H04R 9/045 |

FOREIGN PATENT DOCUMENTS

| | | | |
|---|---|---|---|
| CN | 102110510 | A | 6/2011 |
| CN | 206596209 | U | 10/2017 |
| CN | 207460437 | U | 6/2018 |
| CN | 111083609 | A | 4/2020 |
| EP | 2773132 | A1 | 9/2014 |
| JP | H098076 | A | 1/1997 |

OTHER PUBLICATIONS

Page 7-8 of "Design and Characteristics Simulation Analysis of Voice Coil Cutting Machine" written by FU, Qiang published in Information Science and Technology, Chinese Master's Theses Full-Text Database on Aug. 15, 2017.
Page 219-221 of "Practical handbook for loudspeaker technology" written by Wang, Yizhen published by National Defense Industry Press on Jun. 30, 2006.

* cited by examiner

VOICE COIL WIRE FOR SOUND GENERATING DEVICE, VOICE COIL AND SOUND GENERATING DEVICE

TECHNICAL FIELD

The present disclosure relates to a technical field of acoustics, in particular to a voice coil wire for a sound generating device, a voice coil, and a sound generating device.

BACKGROUND ART

A loudspeaker is a basic sound generating unit that converts electrical signals into acoustic signals. The loudspeaker is provided with a vibration system and a magnetic circuit system, wherein the vibration system includes a voice coil and a diaphragm, when a current is applied to the voice coil, the voice coil vibrates under the force of a magnetic field of the magnetic circuit system, and the vibration of the voice coil drives the diaphragm to vibrate and produce sound.

The voice coil is generally made by winding a voice coil wire. In the prior art, metal wires are generally chosen as the voice coil wire. Among them, copper clad aluminum wire is widely used in loudspeakers due to its high strength and light weight. However, there is a current skin effect in the voice coil wire. That is, when a current is applied to a conductor, the current is concentrated in a thin layer on an outer surface of the conductor, and the current density increases as a distance from the surface of the conductor decreases, and the actual current inside the conductor is small. The skin effect of current leads to a low use efficiency of a central portion of the voice coil wire, which reduces the overall utilization rate of the voice coil wire.

Therefore, in view of the influence of the current skin effect, it is necessary to improve the structure of the existing voice coil wire to improve the utilization rate of the voice coil wire.

SUMMARY OF THE INVENTION

An object of the present disclosure is to provide a voice coil wire for a sound generating device, aiming at solving the technical problem of low utilization rate of the existing voice coil wire.

Another object of the present disclosure is to provide a voice coil provided with the above-mentioned voice coil wire.

Another object of the present disclosure is to provide a sound generating device provided with the above-mentioned voice coil.

A voice coil wire, including a wire body and a cavity provided in the wire body, the wire body is configured to be applied with a current signal, wherein the cavity is in a vacuum state or is filled with an insulating gas.

Optionally, the cavity is arranged along an axis direction of the voice coil wire.

Optionally, the cavity includes a cavity portion in a cross section of the voice coil wire, and a center of the cross section of the voice coil wire is located within the cavity portion.

Optionally, the cavity includes two or more cavity portions in a cross section of the voice coil wire, and two adjacent cavity portions are spaced with the wire body positioned therebetween.

Optionally, a cross section of the cavity portion has a circular or polygonal shape.

Optionally, the wire body is made of a single-layered or double-layered metal material.

Optionally, the wire body is made of copper or copper clad aluminum.

Optionally, with respect to the center axis of the voice coil wire, a distance between the outermost of the wire body and the outermost of the cavity is 0.1 to 0.5 mm.

A voice coil, the voice coil is provided with the above-mentioned voice coil wire.

A sound generating device, including:

- a vibration assembly including a diaphragm and the above-mentioned voice coil, and the diaphragm is coupled to the voice coil;
- a magnetic circuit assembly configured to provide a magnetic field for the voice coil assembly; and
- a housing assembly in which the voice coil assembly and the magnetic circuit assembly are disposed.

The technical solution of the present disclosure has the following beneficial effect: by filling the cavity of the voice coil wire with the insulating gas or configuring the cavity to be in the vacuum state, the weight of the voice coil wire can be reduced, so the influence of skin effect on the voice coil wire is reduced, and the utilization rate of the voice coil wire is improved.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the specification, illustrate embodiments of the present disclosure, and serve to explain the principle of the present disclosure together with the description thereof.

REFERENCE NUMERALS

10: voice coil wire; 11: wire body; 12: cavity; 121: cavity portion.

DETAILED DESCRIPTION OF THE EMBODIMENTS

The technical solutions in the embodiments of the present disclosure will be clearly and completely described below with reference to the accompanying drawings in the embodiments of the disclosure. Obviously, the described embodiments are only part of the embodiments of the present disclosure, not all of the embodiments. Based on the embodiments of the present disclosure, all other embodiments obtained by those of ordinary skill in the art without creative work fall within the protection scope of the present disclosure.

Various exemplary embodiments of the present disclosure will now be described in detail with reference to the accompanying drawings. It should be noted that the relative arrangement of the components and steps, the numerical expressions and numerical values set forth in these embodiments do not limit the scope of the disclosure, unless otherwise specified.

The following description of at least one exemplary embodiment is merely illustrative in fact and is not intended to limit the disclosure, its applications or uses.

Techniques, methods, and apparatus known to those skilled in the relevant art may not be discussed in detail, but where appropriate, such techniques, methods, and apparatus should be considered part of the specification.

In all examples shown and discussed herein, any specific values should be interpreted as merely exemplary and not limiting. Accordingly, other examples of the exemplary embodiment may have different values.

It should be noted that similar numerals and letters represent similar items in the following drawings. Therefore, once an item is defined in a drawing, it does not need to be further discussed in subsequent drawings.

Figure 1:
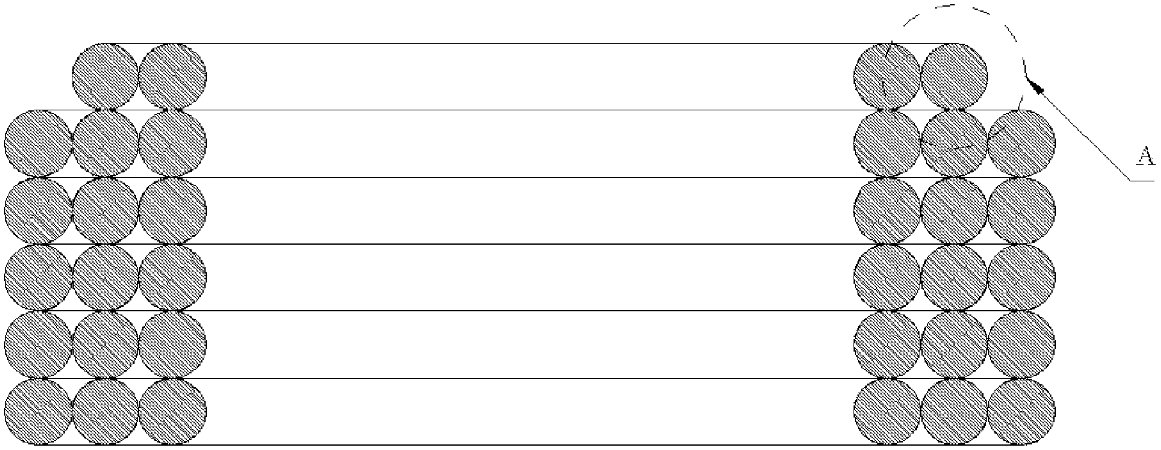
FIG. 1 is a schematic view illustrating a structure of a voice coil in the prior art.
Figure 2:
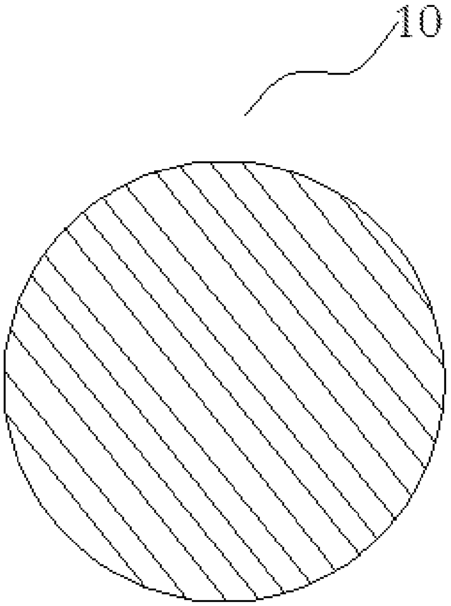
FIG. 2 is a schematic view illustrating a structure of a voice coil wire in the prior art.

FIG. 1 shows a voice coil generally used in the prior art, and FIG. 2 shows structure of a voice coil wire 10. Generally, the voice coil wire has a solid core structure, and the utilization rate inside the voice coil wire is low due to the skin effect of current. Therefore, in view of the problems existing in the prior art, it is necessary to improve the structure of the voice coil wire to improve the overall utilization rate of the voice coil wire.

The present disclosure provides a hollow core voice coil wire, including a wire body and a cavity provided in the wire body, the wire body is configured to be applied with a current signal, wherein the cavity is in a vacuum state or is filled with an insulating gas.

Figure 4:
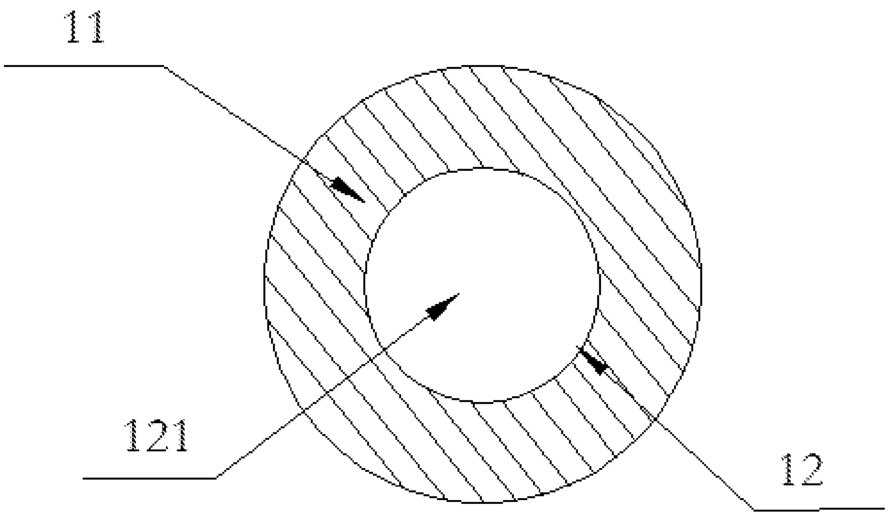
FIG. 4 is a schematic view illustrating a structure of a voice coil wire for a sound generating device according to an embodiment of the present disclosure.

As an embodiment of the present disclosure, referring to FIG. 4, the voice coil wire 10 includes a wire body 11 and a cavity 12 which is formed inside the wire body. Optionally, the cavity may be defined by the wire body. In the present disclosure, the wire body allows a current to flow therethrough. That is, electrons move in an axis direction of the voice coil wire within the wire body. Optionally, the cavity may be set to be in a vacuum state. That is, gas in the cavity is sealed to be in a vacuum state, and thus the cavity exhibits insulating properties. Alternatively, the cavity may be filled with an insulating gas, and thus the cavity also exhibits insulating properties. Optionally, the insulating gas may be air, nitrogen, argon, etc., but the present disclosure is not limited thereto, and it may be selected by those skilled in the art as required.

In the present disclosure, the cavity is enclosed inside the wire body, the wire body allows a current to be applied, and the cavity is filled with an insulating gas or the cavity is configured to be in a vacuum state. With such a structure, the electrical signal conduction characteristics of the voice coil wire is ensured, and the influence of the skin effect of current on the conductive efficiency inside the voice coil wire is reduced. By configuring the cavity to be in an insulating vacuum state or filling the cavity with an insulating gas, the flow uniformity of current in the cross section of the voice coil wire may be improved, and the overall conductive efficiency inside the voice coil wire may be improved. Meanwhile, the setting of the cavity can greatly reduce the weight of the voice coil wire, since the voice coil made of the weight-reduced voice coil wire has smaller weight, and thus the device can generate a larger amplitude under the same level of applied current, and allow a vibration of a wider frequency range, which can significantly improve the vibration sensitivity of the voice coil, thereby improving the acoustic performance of the sound generating device using the voice coil. The reduced weight of the voice coil may facilitate the reducing of the weight of sound generating device.

Optionally, the cavity is arranged along the axis direction of the voice coil wire.

As an embodiment of the present disclosure, the cavity 12 may be configured as a communication body extending along the axis direction of the voice coil wire 10. Configuring the cavity as a communication body extending along the axis direction of the voice coil wire can minimize the weight of the voice coil wire, improve the amplitude and applicable frequency range of the corresponding voice coil, and improve the vibration sensitivity of the voice coil, thereby optimizing the acoustic performance of the sound generating device. In addition, configuring the cavity as a communication body extending along the axis direction of the voice coil wire can greatly reduce the influence of the current skin effect and improve the current flow efficiency of the voice coil wire.

As another embodiment of the present disclosure, the cavity 12 may be provided with a constant interval in the axial direction of the voice coil wire 10. Optionally, a size of each cavity 12 in the axial direction of the voice coil wire may be larger than a size thereof in a radial direction of the voice coil wire or may be smaller than or equal to the size thereof in the radial direction of the voice coil wire, but the present disclosure is not limited thereto. In this case, the breakage of the voice coil wire may not affect the sealing property of the cavity. In addition, the cavity spaced along the axial direction of the voice coil wire can ensure the strength of the voice coil wire.

Optionally, the cavity includes a cavity portion in a cross section of the voice coil wire, and a center of the cross section of the voice coil wire is located within the cavity portion.

As an embodiment of the present disclosure, as shown in FIG. 4, which illustrates a cross section of the voice coil wire 10, the cavity 12 may include a cavity portion 121. Optionally, a center of the cross section of the voice coil wire is located within the cavity portion. That is, the cavity portion is arranged around the center axis of the voice coil wire. With such a structure, the distribution uniformity of electrons in the cross section of the voice coil wire may be improved, the influence of the current skin effect may be reduced, and the current conduction efficiency of the voice coil wire may be improved. Meanwhile, the cavity portion being arranged around the center axis of the voice coil wire can improve the structural symmetry of the voice coil wire, which may facilitate the reducing of the polarization of the corresponding voice coil.

Optionally, the cavity includes two or more cavity portions in a cross section of the voice coil wire, and two adjacent cavity portions are spaced with the wire body positioned therebetween.

Figure 5:
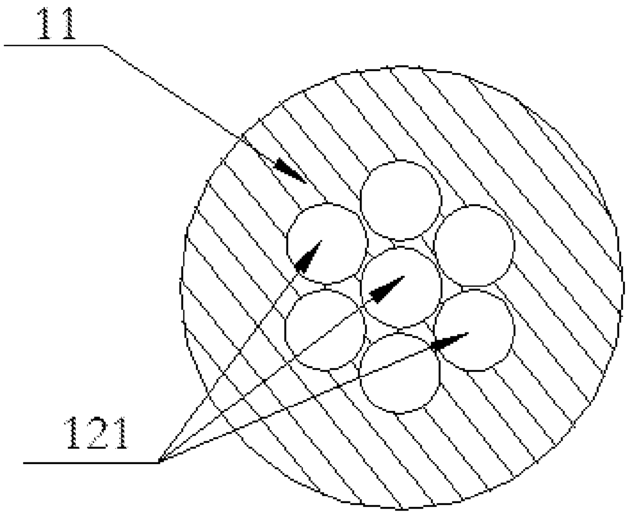
FIG. 5 is a schematic view illustrating a structure of a voice coil wire for a sound generating device according to an embodiment of the present disclosure.

As an embodiment of the present disclosure, the cavity 12 may include two or more cavity portions 121 on the cross section of the voice coil wire 10, and two adjacent cavity portions are spaced with the wire body 11 positioned therebetween. As such, the influence of the current skin effect may be reduced and the current conduction efficiency of the voice coil wire may be improved. In addition, a damage in the sealing of the cavity caused by a damage to an outer surface damage of the voice coil wire or a local defect can be avoided. Meanwhile, due to the cavity portion, the weight of the voice coil wire may be effectively reduced, increase the amplitude of the voice coil, the vibration frequency range may be expanded, and the vibration sensitivity of the voice coil may also be improved. In an example, as shown in FIG. 5, the cavity 12 may include seven cavity portions 121, one of which is located at the center of the cross section of the voice coil wire, and the other six cavity portions are arranged around it. This arrangement makes the voice coil wire have good symmetry, which can reduce or avoid the polarization of the voice coil caused by an asymmetric structure. Of course, the distribution form of the cavity portions on the cross section can be arranged according to actual situations, and the present disclosure is not limited thereto.

Optionally, a cross section of the cavity portion has a circular or polygonal shape.

As an embodiment of the present disclosure, the cross section of the cavity portion 121 may have a circular shape, which facilitates the processing of the cavity portion. Optionally, the cavity portion may also be provided with a polygonal shape. However, the present disclosure is not limited thereto.

Optionally, the wire body is made of a single-layered or double-layered metal material.

Optionally, the wire body is made of copper or copper clad aluminum.

As an embodiment of the present disclosure, the wire body 11 may be made of a single-layered metal material to facilitate the conducting of the current. Optionally, the wire body may be made of metal copper, which has the advantages of good conductivity, high strength and low price, and can reduce the manufacturing cost of the voice coil. Alternatively, the wire body may be made of a double-layered metal material to facilitate the conducting of the current. Optionally, the wire body may be made of copper clad aluminum, which has the advantages of good conductivity, light weight, small specific gravity, high strength and low price, can not only reduce the manufacturing cost of the voice coil, but also effectively improve the vibration performance of the voice coil, thereby improving the acoustic performance of the sound generating device. The wire body of the present disclosure may also be other metal materials or conductive non-metallic materials, but the present disclosure is not limited thereto.

Optionally, with respect to the center axis of the voice coil wire, a distance between the outermost of the wire body and the outermost of the cavity is 0.1 to 0.5 mm.

The outermost of the wire body in the present disclosure refers to a position where the wire body is farthest from the center in a cross section of the voice coil wire. Likewise, the outermost of the cavity refers to a position where the cavity is farthest from the center in the cross section of the voice coil wire. Optionally, with respect to the center axis of the voice coil wire, a distance between the outermost of the wire body and the outermost of the cavity may be 0.1 to 0.5 mm. Optionally, when the cross-sectional shape of the wire body is circular and the cavity only includes a circular cavity portion, the distance refers to the thickness of the wire body. Optionally, the thickness of the wire body may also be ¼ of the diameter of the voice coil wire, but the thickness of the wire body of the present disclosure is not limited to it. When the distance between the outermost of the wire body and the outermost of the cavity is within 0.2 to 0.3 mm, due to the reduced weight of the voice coil wire with which the voice coil is wound, and the voice coil may vibrate in a larger frequency range, and a larger amplitude can be achieved at the same time, and the acoustic performance of the sound generating device having the voice coil is also good.

Figure 3:
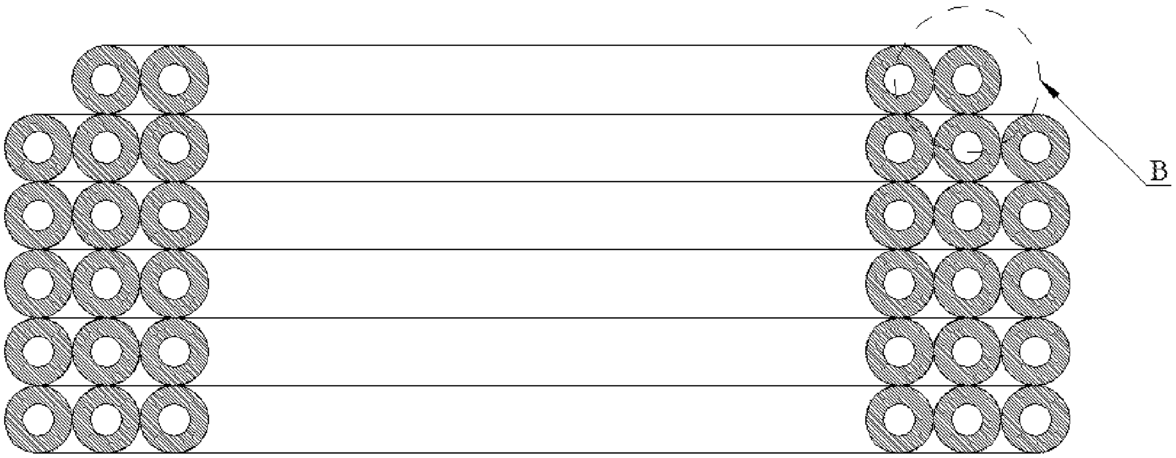
FIG. 3 is a schematic view illustrating a structure of a voice coil according to an embodiment of the present disclosure.

The present disclosure also provides a voice coil having the above-mentioned voice coil wire. Optionally, the voice coil is made by winding the voice coil wire provided by the present disclosure, as illustrated in FIG. 3. The structure of the voice coil may have a tubular shape or a hollow square shape, but the present disclosure is not limited thereto.

The present disclosure also provides a sound generating device, including: a vibration assembly including a diaphragm and the above-mentioned voice coil, the diaphragm is coupled to the voice coil, and the vibration assembly is configured to generate sound by vibration; a magnetic circuit assembly configured to provide a magnetic field for the voice coil assembly; and a housing assembly in which the voice coil assembly and the magnetic circuit assembly are disposed.

Specifically, the sound generating device includes a vibration assembly including a diaphragm and the voice coil described above, which are combined together. Optionally, the diaphragm is coupled to the voice coil. The sound generating device also includes a magnetic circuit assembly configured to provide a magnetic field for the voice coil assembly. Optionally, the voice coil is suspended in a magnetic gap formed in the magnetic circuit assembly. The sound generating device also includes a housing assembly configured to receive the voice coil assembly and the housing assembly, so as to protect the voice coil assembly and the housing assembly. The sound generating device of the present disclosure has reduced weight and good acoustic performance.

Of course, the vibration assembly of the present disclosure may not include a diaphragm, and the sound generating device formed thereby is used for sound production on the screen of an electronic product. However, the present disclosure is not limited thereto.

In the present disclosure, by filling the cavity of the voice coil wire with the insulating gas or configuring the cavity to be in the vacuum state, the weight of the voice coil wire can be reduced, so the influence of current skin effect on the current flow efficiency inside the voice coil wire is reduced, and the utilization rate of the voice coil wire is improved.

Although some specific embodiments of the present disclosure have been described in detail by way of examples, those skilled in the art should understand that the above examples are provided for illustration only and are not intended to limit the scope of the present disclosure. Those skilled in the art will appreciate that modifications may be made to the above embodiments without departing from the scope and spirit of the present disclosure. The scope of the present disclosure is defined by the appended claims.

What is claimed is:

1. A voice coil wire for a sound generating device, comprising:

a wire body and a cavity provided in the wire body, the wire body is configured to be applied with a current signal, wherein the cavity is in a vacuum state or is filled with an insulating gas.

2. The voice coil wire for a sound generating device of claim 1, wherein the cavity is arranged along an axis direction of the voice coil wire.

3. The voice coil wire for a sound generating device of claim 1, wherein the cavity comprises a cavity portion in a cross section of the voice coil wire, and a center of the cross section of the voice coil wire is located within the cavity portion.

4. The voice coil wire for a sound generating device of claim 3, wherein a cross section of the cavity portion has a circular or polygonal shape.

5. The voice coil wire for a sound generating device of claim 1, wherein the cavity comprises two or more cavity portions in a cross section of the voice coil wire, and two adjacent cavity portions are spaced with the wire body positioned therebetween.

6. The voice coil wire for a sound generating device of claim 5, wherein a cross section of the cavity portion has a circular or polygonal shape.

7. The voice coil wire for a sound generating device of claim 1, wherein the wire body is made of a single-layered or double-layered metal material.

8. The voice coil wire for a sound generating device of claim 7, wherein the wire body is made of copper or copper clad aluminum.

9. The voice coil wire for a sound generating device of claim 1, wherein with respect to a center axis of the voice coil wire, a distance between the outermost of the wire body and the outermost of the cavity is 0.1 mm to 0.5 mm.

10. A voice coil, comprising the voice coil wire for a sound generating device of claim 1.

11. A sound generating device, comprising:

a vibration assembly comprising a diaphragm and the voice coil of claim 9, the diaphragm is coupled to the voice coil;

a magnetic circuit assembly configured to provide a magnetic field for the voice coil assembly; and a housing assembly in which the voice coil assembly and the magnetic circuit assembly are disposed.

* * * * *